United States Patent Office 3,403,199
Patented Sept. 24, 1968

3,403,199
DIGLYCIDYL ETHER OF POLYHYDRIC ALCOHOLS WITH DIAMINES OR HYDROQUINONES AND BIS(2,3-EPOXYCYCLOPENTYL)ETHER
Thomas Ramos, 536 Fort Washington Ave., New York, N.Y. 10033
No Drawing. Continuation-in-part of application Ser. No. 512,269, Dec. 6, 1965. This application Mar. 8, 1966, Ser. No. 534,971
14 Claims. (Cl. 260—830)

ABSTRACT OF THE DISCLOSURE

Production of synthetic resins derived from a diglycidyl ether of a polyhydric alcohol, a phenol and a diepoxycycloaliphatic ether. These resins are useful for embedding, encapsulating, casting, filament winding, reinforced plastics and syntactic foam applications. A specific example of one such resin, 1,4-butanediol diglycidyl ether, monotertiary-butylhydroquinone and bis(2,3-epoxycyclopentyl)ether has been used experimentally for the preparation of syntactic foams, and glass filament wound structures.

The invention described herein may be manufactured and used by or for the Government of the United States of America for governmental purposes without the payment of any royalties thereon or therefor.

This application is a continuation-in-part of my copending application Ser. No. 512,269, filed Dec. 6, 1965.

This invention relates to synthetic resinous materials or polymers, and more particularly to those useful for embedding, encapsulating, laminating, casting, filament winding, sealing, plotting, reinforced plastics, coating, and syntactic foam applications.

There has long been a need for a satisfactory resin that can be used to encapsulate or embed delicate equipment and various items for their protection, but resins heretofore available for this purpose have been unsatisfactory for various reasons, one of which was because they were so brittle and hard that they did not give the desired degree of protection.

An object of this invention is to provide new and improved resins, and methods of making them, which are especially useful, suitable and practical for embedding and encapsulating electronic equipment and other items, and as coating materials, which have desired physical properties including selected degree of hardness and structural strength when cured to make them suitable for the intended purpose, and which are relatively inexpensive, easily made, and practical and durable in use.

Other objects and advantages will appear from the following description of some examples of the invention, and the novel features will be particularly pointed out in connection with the appended claims.

In accordance with this invention, synthetic resins and, in particular, novel block copolymers, having important and useful physical properties may be prepared by the inter-reaction of certain diglycidyl ethers such as those obtained from certain polyhydric alcohols, with (1) either (a) an aromatic chlorine hindered diamine or aromatic sulphur-containing diamine such as, for example, 4,4'-methylenebis-(2 - chloroaniline) or 4,4'-diaminodiphenyl sulfone, or (b) with hydroquinone and also its derivatives such as monotertiary - butylhydroquinone, toluhydroquinone and hydroquinone monomethyl ether, and further with (2) a diepoxycycloaliphatic ether compound such as bis(2,3-epoxycyclopentyl)ether to produce a block prepolymer and then adding to the said product of such reaction, at a time just prior to the curing of such product a suitable curing agent such as an aromatic amine or aliphatic amine.

Examples of diglycidyl ethers obtained from epichlorohydrin and a chlorohydrin ether of a polyhydric alcohol which may be employed are disclosed in U.S. Patent 3,033,803, issued on May 8, 1962. Some examples of polyhydric alcohols that may be used in preparing diglycidyl ethers of polyhydric alcohols are those having a hydrocarbon chain between the hydroxyl groups. These polyhydric alcohols are advantageous in imparting an aliphatic hydrocarbon element into the resulting glycide ether. Among such alcohols are ethylene glycol, butanediol, diethylene glycol, triethylene glycol, hexanetriol, glycerol, and various polyethylene glycols and polypropylene glycols, etc. These diglycidyl ethers obtained with such polyhydric alcohols in accordance with the disclosure in said U.S. Patent 3,033,803 are the basic components used for reaction with the particular diamines or with the hydroquinone or its derivatives and further with the cycloaliphatic diepoxy compounds in accordance with this invention.

Some specific examples of the polyhydric alcohols used for the preparation of the diglycidyl ethers that may be employed include ethylene glycol; diethylene glycol; triethylene glycol; tripropylene glycol; 1,5-pentanediol; 1,4-butanediol; 1,3-butanediol; 2,3-butanediol and 2-butenediol-1,4.

Examples of diglycidyl ethers include:

Diglycidyl ethers of polyhydric alcohols—
    1,4-butanediol diglycidyl ether
    1,3-butanediol diglycidyl ether
    2,3-butanediol diglycidyl ether
    1,5-pentanediol diglycidyl ether
    Ethylene glycol diglycidyl ether
    Diethylene glycol diglycidyl ether
    Triethylene glycol diglycidyl ether
    Tripropylene glycol diglycidyl ether
    Hexanetriol diglycidyl ether
    Polyethylene glycol diglycidyl ether
    Glycerine diglycidyl ether
    2-butenediol-1,4-diglycidyl ether Specific hydroquinone and amine inter-reactants are:

Hydroquinones—
    Hydroquinone
    Toluhydroquinone
    Hydroquinone monomethyl ether
    Monotertiarybutylhydroquinone Aromatic diamines—
    4,4'-methylenebis(2-chloroaniline)
    4,4'-diaminodiphenyl sulfone The three-component reaction product (i.e., (A) diglycidyl ether or a polyhydric alcohol, and component (B) aromatic diamine [or hydroquinone], and (C) diepoxy cycloaliphatic compound) is prepared as follows:

To be even more specific glyamine prepolymers are the basic component used to form block prepolymers with the following types of epoxy resins:

(a) The liquid and solid isomers of bis(2,3-epoxycyclopentyl)ether, or
(b) its various isomers, or
(c) its derivatives, and
(d) their homopolymers, or
(e) any other epoxy resin which contains more than one oxirane atom bonded to cycloaliphatic carbon atoms, or
(f) any combinations of the mixtures of (a), (b), (c), or (e) thereof.

Specific combinations of diglycidyl ethers of polyhydric alcohols (reactant (A)) and the other coreactant (B) to produce the glyamine prepolymers employed in the present invention are tabulated below:

GLYAMINE PREPOLYMERS

The said prepolymers are the reaction products of:

1,4-butanediol diglycidyl ether and hydroquinone
1,4-butanediol diglycidyl ether and toluhydroquinone
1,4-butanediol diglycidyl ether and hydroquinone monomethyl ether
1,4-butanediol diglycidyl ether and monotertiary-butylhydroquinone
1,4-butanediol diglycidyl ether and 4,4'-methylenebis-(2-chloroaniline)
1,4-butanediol diglycidyl ether and 4,4'-diaminodiphenylsulfone
1,3-butanediol diglycidyl ether and hydroquinone
1,3-butanediol diglycidyl ether and toluhydroquinone
1,3-butanediol diglycidyl ether and hydroquinone monomethyl ether
1,3-butanediol diglycidyl ether and monotertiary-butylhydroquinone
1,3-butanediol diglycidyl ether and 4,4'-methylenebis-(2-chloroaniline)
1,3-butanediol diglycidyl ether and 4,4'-diaminodiphenylsulfone
2,3-butanediol diglycidyl ether and hydroquinone
2,3-butanediol diglycidyl ether and toluhydroquinone
2,3-butanediol diglycidyl ether and hydroquinone monomethyl ether
2,3-butanediol diglycidyl ether and monotertiary butylhydroquinone
2,3-butanediol diglycidyl ether and 4,4'-methylenebis-(2-chloroaniline)
2,3-butanediol diglycidyl ether and 4,4'-diaminodiphenylsulfone
2-butenediol-1,4-diglycidyl ether and hydroquinone
2-butenediol-1,4-diglycidyl ether and toluhydroquinone
2-butenediol-1,4-diglycidyl ether and hydroquinone monomethyl ether
2-butenediol-1,4-diglycidyl ether and monotertiary-butylhydroquinone
2-butenediol-1,4-diglycidyl ether and 4,4'-methylenebis(2-chloroaniline)
2-butenediol-1,4-diglycidyl ether and 4,4'-diaminodiphenylsulfone
1,5-pentanediol diglycidyl ether and hydroquinone
1,5-pentanediol diglycidyl ether and toluhydroquinone
1,5-pentanediol diglycidyl ether and hydroquinone monomethyl ether
1,5-pentanediol diglycidyl ether and monotertiary-butylhydroquinone
1,5-pentanediol diglycidyl ether and 4,4'-menthylene-bis(2-chloroaniline)
1,5-pentanediol diglycidyl ether and 4,4'-diaminodiphenylsulfone
Ethylene glycol diglycidyl ether and hydroquinone
Ethylene glycol diglycidyl ether and toluhydroquinone
Ethylene glycol diglycidyl ether and hydroquinone monomethyl ether
Ethylene glycol diglycidyl ether and monotertiary-butylhydroquinone
Ethylene glycol diglycidyl ether and 4,4'-methylenebis(2-chloroaniline)
Ethylene glycol diglycidyl ether and 4,4'-diaminodiphenylsulfone
Diethylene glycol diglycidyl ether and hydroquinone
Diethylene glycol diglycidyl ether and toluhydroquinone
Diethylene glycol diglycidyl ether and hydroquinone monomethyl ether
Diethylene glycol diglycidyl ether and monotertiary-butylhydroquinone
Diethylene glycol diglycidyl ether and 4,4'-methylenebis(2-chloroaniline)
Diethylene glycol diglycidyl ether and 4,4'-diaminodiphenylsulfone
Triethylene glycol diglycidyl ether and hydroquinone
Triethylene glycol diglycidyl ether and toluhydroquinone
Triethylene glycol diglycidyl ether and hydroquinone monomethyl ether
Triethylene glycol diglycidyl ether and monotertiary butyl hydroquinone
Triethylene glycol diglycidyl ether and 4,4'-methylenebis(2-chloroaniline)
Triethylene glycol diglycidyl ether and 4,4'-diaminodiphenylsulfone
Tripropylene glycol diglycidyl ether and hydroquinone
Tripropylene glycol diglycidyl ether and toluhydroquinone
Tripropylene glycol diglycidyl ether and hydroquinone monomethyl ether
Tripropylene glycol diglycidyl ether and monotertiary-butylhydroquinone
Tripropylene glycol diglycidyl ether and 4,4'-methylenebis(2-chloroaniline)
Tripropylene glycol diglycidyl ether and 4,4'-diaminodiphenylsulfone
Hexanetriol diglycidyl ether and hydroquinone
Hexanetriol diglycidyl ether and toluhydroquinone
Hexanetriol diglycidyl ether and hydroquinone monomethyl ether
Hexanetriol diglycidyl ether and monotertiary-butylhydroquinone
Hexanetriol diglycidyl ether and 4,4'-methylenebis(2-chloroaniline)
Hexanetriol diglycidyl ether and 4,4'-diaminodiphenylsulfone
Polyethylene glycol diglycidyl ether and hydroquinone
Polyethylene glycol diglycidyl ether and toluhydroquinone
Polyethylene glycol diglycidyl ether and hydroquinone monomethyl ether
Polyethylene glycol diglycidyl ether and monotertiary-butylhydroquinone
Polyethylene glycol diglycidyl ether and 4,4'-methylenebis(2-chloroaniline)
Polyethylene glycol diglycidyl ether and 4,4'-diaminodiphenylsulfone
Glycerine diglycidyl ether and hydroquinone
Glycerine diglycidyl ether and toluhydroquinone
Glycerine diglycidyl ether and hydroquinone monomethyl ether
Glycerine diglycidyl ether and monotertiary-butylhydroquinone
Glycerine diglycidyl ether and 4,4'-methylenebis (2-chloroaniline)
Glycerine diglycidyl ether and 4,4'-diaminodiphenylsulfone The above reaction products as obtained are low viscosity liquids. In preparing the above prepolymers, it has been found that for each 100 parts by weight of diglycidyl ether, there should be employed from about 15 to 85 parts by weight of the amine or phenolic co-reactant.

The general procedure for preparing such prepolymers involves mixing the reactants, and preferably by adding to the preheated diglycidyl ether the other co-reactant, maintaining the reaction mixture, while stirring, to a temperature between about 100° C. (212° F.) and about 132° C. (270° F.) but not over 150° C. (about 300° F.) until a homogeneous liquid is obtained. When such homogeneity results, the reaction mixture is immediately cooled to about room temperature, i.e., between about 50° F. and 100° F.

The amount of bis(2,3-epoxycyclopentyl)ether component (C) may vary from about 1 part by weight thereof per 10 parts by weight of glyamine prepolymer to 10 parts by weight thereof per one part by weight of glyamine prepolymer.

The preferred glyamine prepolymers are as follows.

Examples of preferred glyamine prepolymers:

1,4-butanediol diglycidyl ether and hydroquinone
1,4-butanediol diglycidyl ether and toluhydroquinone
1,4-butanediol diglycidyl ether and hydroquinone monomethyl ether
1,4-butanediol diglycidyl ether and monotertiarybutylhydroquinone
1,3-butanediol diglycidyl ether and hydroquinone
1,3-butanediol diglycidyl ether and toluhydroquinone
1,3-butanediol diglycidyl ether and hydroquinone monomethyl diglycidyl ether and monotertiarybutylhydroquinone
2,3-butanediol diglycidyl ether and hydroquinone
2,3-butanediol diglycidyl ether and toluhydroquinone
2,3-butanediol diglycidyl ether and hydroquinone monomethyl ether
2,3-butanediol diglycidyl ether and monotertiarybutylhydroquinone
1,5-pentanediol diglycidyl ether and hydroquinone
1,5-pentanediol diglycidyl ether and toluhydroquinone
1,5-pentanediol diglycidyl ether and hydroquinone monomethyl ether
1,5-pentaediol diglycidyl ether and monotertiarybutylhydroquinone
Ethylene glycol diglycidyl ether and hydroquinone
Ethylene glycol diglycidyl ether and toluhydroquinone
Ethylene glycol diglycidyl ether and hydroquinone monomethyl ether
Ethylene glycol diglycidyl ether and monotertiarybutylhydroquinone
Diethylene glycol diglycidyl ether and hydroquinone
Diethylene glycol diglycidyl ether and toluhydroquinone
Diethylene glycol diglycidyl ether and hydroquinone monomethyl ether
Diethylene glycol diglycidyl ether and monotertiarybutylhydroquinone
Triethylene glycol diglycidyl ether and hydroquinone
Triethylene glycol diglycidyl ether and toluhydroquinone
Triethylene glycol diglycidyl ether and hydroquinone monomethyl ether
Triethylene glycol diglycidyl ether and monotertiarybutylhydroquinone
Tripropylene glycol diglycidyl ether and hydroquinone
Tripropylene glycol diglycidyl ether and toluhydroquinone
Tripropylene glycol diglycidyl ether and hydroquinone monomethyl ether
Tripropylene glycol diglycidyl ether and monotertiarybutylhydroquinone
Hexanetriol diglycidyl ether and hydroquinone
Hexanetriol diglycidyl ether and toluhydroquinone
Hexanetriol diglycidyl ether and hydroquinone monomethyl ether
Hexanetriol diglycidyl ether and monotertiarybutylhydroquinone
Polyethylene glycol diglycidyl ether and hydroquinone
Polyethylene glycol diglycidyl ether and toluhydroquinone
Polyethylene glycol diglycidyl ether and hydroquinone monomethyl ether
Polyethylene glycol diglycidyl ether and monotertiarybutylhydroquinone
Glycerine diglycidyl ether and hydroquinone
Glycerine diglycidyl ether and toluhydroquinone
Glycerine diglycidyl ether and hydroquinone monomethyl ether
Glycerine diglycidyl ether and monotertiarybutylhydroquinone
2-butenediol 1,4-diglycidyl ether and hydroquinone
2-butenediol 1,4-diglycidyl and toluhydroquinone
2-butenediol-1,4-diglycidyl ether and hydroquinone
2-butenediol-1,4-diglycidyl and monotertiarybutylhydroquinone It is to be noted that one, two or more mixtures of glyamine prepolymers may be mixed with one, two or more mixtures of the epoxy resins as defined above, to form block prepolymers. Similarly, mixtures of curing agents may be used to cure the said block prepolymers. The three-component block prepolymer is then reacted to the final cured block copolymer resin with an amine curing agent.

Suitable curing agents include:

Aliphatic amines—
　N-aminoethylpiperazine
　Diethylenetriamine
　Triethylenetetramine
　Tetraethylenepentamine
　3-isopropylaminopropylamine
　Trimethylenediamine
　Propylene diamine Aromatic amines—
　Meta-phenylenediamine
　Meta-tolylenediamine
　Ortho-tolylenediamine
　1,8-naphthylenediamine
　4,4'-methylenedianiline As a general criterion, the particular curing agent employed will be determined by the maximum operating temperature limits and flexibility of the cured resin. Since the curing agent used in this invention becomes an integral part of the cured resin, the type and amount of curing agent employed has a profound effect on the physical and chemical properties of the cured resin.

The following generalizations should prove useful in selecting other amines for use in this invention:

(a) To be useful as room temperature curing agents for this invention, the amines or amine mixtures must have an average functionality greater than about 2, i.e., more than 2 amine hydrogens per molecule.

(b) Aromatic amines, those which have the amine groups attached directly to a benzene ring or other aromatic nucleus, are suitable as curing agents for this invention. These are the preferred curing agents.

(c) Provided that suitable curing agents, as defined in (a) or (b) above, are used, the degree of cure, as measured by hardness, solvent resistance and/or flexibility, increases with functionality of the amine and decreases as the distance between amine hydrogens increases.

(d) Flexibility and flexibility retention fall off with increasing degree of cure.

The following examples will illustrate the preparation of glyamine prepolymers, block prepolymers, and cured block copolymer resins in accordance with this invention, without being deemed limitative thereof. Parts are by weight unless otherwise indicated.

Example 1

55.0 parts by weight of 4,4'-methylenebis(2-chloroaniline) are added slowly while stirring to 100.00 parts by weight of 1,4-butanediol diglycidyl ether that has been preheated to between 212–225° F. The mixture is thereafter maintained at between 212–225° F. while stirring until a homogeneous liquid is obtained. If the temperature exceeds 250° F., the reaction is too rapid and should be avoided. External cooling may be used, if necessary. The reaction product thus obtained is immediately cooled to room temperature to inhibit further reaction and is hereinafter, for convenience, called "Glyamine A" prepolymer.

Typical or representative tabulations of approximate amounts of constituents used in obtaining "Glyamine A" prepolymer in accordance with the process as outlined in Example 1, are as follows:

Example 2

| Constituents: | Parts by wt. |
|---|---|
| 1,4-butanediol diglycidyl ether | 100 |
| 4,4'-methylenebis(2-chloroaniline) | 15–85 |

A specific example of a "Glyamine A" prepolymer prepared from the reaction of 1,4-butanediol diglycidyl ether with 4,4-diaminodiphenyl sulfone is as follows:

Example 3

55.0 parts by weight of 4,4'-diaminodiphenylsulfone are added slowly while stirring to 100 parts by weight 1,4-butanediol diglycidyl ether, preheated to between 240–250° F. The mixture is thereafter maintained at between 240–250° F. while stirring until a homogeneous liquid is obtained. The temperature should not exceed 250° F., using external cooling, if necessary. The reaction product thus obtained is immediately cooled to room temperature and is hereinafter also called "Glyamine A" prepolymer.

The following example is a typical or representative tabulation of approximate amounts of constituents used in obtaining "Glyamine A" prepolymer in accordance with the process as outlined in Example 3 above and is as follows.

Example 4

| Constituents: | Parts by wt. |
|---|---|
| 1,4-butanediol diglycidyl ether | 100 |
| 4,4'-diaminodiphenylsulfone | 15–85 |

The above Examples 3 and 4 serve to illustrate that as a general rule "Glyamine A" prepolymers can be prepared in different ways to yield products which exhibit a range of properties depending on choice of reactants, method of preparation and ratio of reactants.

"MOCA" is the trade name for 4,4'-methylene bis(2-chloroaniline) marketed by E. I. du Pont de Nemours & Co., Inc. "MOCA" is described, for example, in Development Products Report No. 2 of Mar. 1, 1957, published in printed form and distributed by the said E. I. du Pont de Nemours & Co., Inc. "MOCA" comes in several physical forms, one form being a fine powder, light tan in color, the other form being in pellets almost white in color. It is preferred to use "MOCA" in the physical form of pellets which are almost white in color.

For the sake of color, uniformity of product and quality control of the products as made in accordance with my invention, it is preferred that "MOCA," in the physical form of pellets, be used.

Substitution of one physical form of "MOCA" for the other will yield products of different colors and properties which will lack some uniformity of product from batch to batch.

"Araldite RD–2" is the trade name for 1,4-butanediol diglycidyl ether, is marketed by Ciba Products Corporation, Kimberton, Pa., and is described in Provisional Technical Data Bulletin 27, published in printed form and distributed by the said Ciba Products Corporation.

4,4'-diaminodiphenylsulfone is marketed by the Ciba Products Corporation, Fairlawn, N.J. under the trade name of "Ciba Eporal," and is described in printed form, in Technical Data Bulletin 21128/1, published by Ciba Products Corporation.

Example 5

55.0 parts by weight of monotertiary-butylhydroquinone are added slowly, while stirring to 100.0 parts by weight 1,4-butanediol diglycidyl ether, preheated to between 250–260° F. The mixture is thereafter maintained at between 250–260° F., while stirring until a homogeneous liquid is obtained. The temperature should not exceed 260° F., using external cooling if necessary. The reaction product thus obtained is immediately cooled to room temperature and is hereinafter called "Glyamine B" prepolymer.

Typical or representative tabulations of approximate amounts of constituents used in obtaining "Glyamine B" prepolymer in accordance with process as outlined in Example 5 are as follows.

Example 6

| Constituents: | Parts by wt. |
|---|---|
| 1,4-butanediol diglycidyl ether | 100 |
| Monotertiary-butylhydroquinone | 15–85 |

In each of all examples given herein, the mixing may be performed in any manner such as, for example, in propeller type mixers or stirrers, or by any other efficient means for producing a homogeneous product.

Other hydroquinones which generally find use in the preparation of "Glyamine B" prepolymer are as follows:

Other hydroquinone derivatives which may be used—
2,5-ditertiary-butylhydroquinone.

All of the said above hydroquinone derivatives are marketed by Eastman Chemical Products, Inc., Kingsport, Tenn.

Monotertiary-butylhydroquinone is also marketed by Eastman Chemical Products, Inc. The properties of this hydroquinone are set forth in Technical Data Sheet No. D–108, published in printed form, prior to my invention by the Eastman Chemical Products, Inc.

Other "Glyamine B" prepolymers based on hydroquinone derivatives are as follows:

Example 7

55.0 parts by weight of hydroquinone monomethyl ether are added slowly while stirring to 100.0 parts by weight of 1,4-butanediol diglycidyl ether that has been preheated to between 140–212° F. The mixture is thereafter maintained at between 140–212° F. while stirring until a homogeneous liquid is obtained. The temperature should not exceed above 220° F. The reaction product thus obtained is immediately cooled to room temperature or below to inhibit further reaction and is also called "Glyamine B" prepolymer.

The following example is a typical tabulation of approximate amounts of constituents used in obtaining "Glyamine B" prepolymer in accordance with the process as outlined in Example 7 above:

Example 8

| Constituents: | Parts by wt. |
|---|---|
| 1,4-butanediol diglycidyl ether | 100 |
| Hydroquinone monomethyl ether | 15–62 |

Example 9

55.0 parts by weight of toluhydroquinone are added slowly while stirring to 100.0 parts by weight of 1,4-butanediol diglycidyl ether that has been preheated to between 212–260° F. The mixture is thereafter maintained at between 212–260° F. while stirring until a homogeneous liquid is obtained. The temperature shall not exceed 270° F. The reaction product thus obtained is immediately cooled to room temperature or below to inhibit further reaction and is also called "Glyamine B" prepolymer.

The following example is a typical tabulation of approximate amounts of constituents used in obtaining "Glyamine B" prepolymer in accordance with the process in Example 9 above.

Example 10

| Constituents: | Parts by wt. |
|---|---|
| 1,4-butanediol diglycidyl ether | 100 |
| Toluhydroquinone | 15–62 |

Example 11

Example 1 is repeated employing the following diglycidyl ethers in equivalent amounts in place of 1,4-butanediol diglycidyl ether:

A. 1,3-butanediol diglycidyl ether
B. 2,3-butanediol diglycidyl ether
C. 2-butenediol-1,4-diglycidyl ether
D. 1,5-pentanediol diglycidyl ether
E. Ethylene glycol diglycidyl ether
F. Diethylene glycol diglycidyl ether
G. Triethylene glycol diglycidyl ether
H. Tripropylene glycol diglycidyl ether
I. Hexanetriol diglycidyl ether
J. Polyethylene glycol diglycidyl ether
K. Glycerine diglycidyl ether

Example 12

Example 11 is repeated using the following, in equivalent amounts in place of the chloroaniline of that example:

A. 4,4'-diaminodiphenylsulfone
B. Hydroquinone
C. Toluhydroquinone
D. Hydroquinone monomethyl ether
E. Monotertiary-butylhydroquinone

Example 13

Examples 12A, 12B, 12C, 12D, and 12E are each repeated, separately, using in place of 1,3-butanediol diglycidyl ether, the following in equivalent amounts:

(1) 2,3-butanediol diglycidyl ether
(2) 2-butenediol-1,4-diglycidyl ether
(3) 1,5-pentanediol diglycidyl ether
(4) Ethylene glycol diglycidyl ether
(5) Diethylene glycol diglycidyl ether
(6) Triethylene glycol diglycidyd ether
(7) Tripropylene glycol diglycidyl ether
(8) Hexanetriol diglycidyl ether
(9) Polyethylene glycol diglycidyl ether
(10) Glycerine diglycidyl ether Excellent products, i.e., prepolymers, are obtained.

In the above examples, the prepolymers are described as derived from one diglycidyl ether and a single co-reactant amine or hydroxy compound. It is, of course, clear that two or more different diglycidyl ethers may be reacted with one, two or more co-reactant amines or hydroquinones.

In each and all Examples 5, 6, 7, 8, 9 and 10, it is of course understood that in each formulation the diepoxycycloaliphatic ether, e.g., bis(2,3-epoxycyclopentyl)ether is added to and prepared at the same time with the other two components to produce the block prepolymers of this invention.

Alternate ways to prepare the block prepolymers of the invention are as follows:

Example 14

Components: Parts by wt.
Glyamine prepolymer of Example 5 _____ 100
Liquid isomer of bis(2,3-epoxycyclopentyl) ether _____ 200

The said components are mixed thoroughly at room temperature until homogeneous.

It is postulated that the said block prepolymer has an epoxide equivalent of about 116.

The said block prepolymer is cured using metaphenylenediamine as the curing agent.

Procedure for adding meta-phenylenediamine to said block prepolymer is as follows:

(1) The block prepolymer is maintained at room temperature; prior to addition of curing agent.

(2) 85.2 parts by weight meta-phenylenediamine are preheated to between 150° F., and 155° F. until molten.

(3) The molten meta-phenylenediamine is maintained at between 150° F. and 155° F., and is then added to the block prepolymer.

(4) The admixture of block prepolymer and meta-phenylenediamine is stirred until it is homogeneous.

(5) The homogeneous admixture of block prepolymer and meta-phenylenediamine is allowed to stand at room temperature until it becomes gelled.

Finally, the gelled admixture is cured as follows:

7 hours at 145° F., then
7 hours at 220° F., then
7 hours at 270° F., then
6–24 hours at 320° F.

Example 15

Example 14 is repeated using 100 parts by weight of the glyamine prepolymer of Example 5, and 100 parts by weight of the liquid isomer of bis(2,3-epoxycyclopentyl)ether and 56.8 parts by weight of meta-phenylenediamine.

It is postulated that the said block prepolymer has an epoxide equivalent of about 130.

The mixture is cured as follows:

7 hours at 135° F., then
7 hours at 210° F., then
7 hours at 270° F.
6–24 hours at 320° F.

Example 16

Example 14 is again repeated using 75 parts by weight of the glyamine prepolymer of Example 5, and 100 parts by weight of the liquid isomer of bis(2,3-epoxycyclopentyl)ether and 49.7 parts by weight of meta-phenylenediamine.

It is postulated that the said block prepolymer has an epoxide equivalent of about 124.

The mixture is cured as follows:

7 hours at 140° F., then
7 hours at 210° F., then
7 hours at 270° F., then
6–24 hours at 320° F.

Example 17

Example 14 is again repeated using 100 parts by weight of the glyamine prepolymer of Example 5 and 10 parts by weight of the liquid isomer of bis(2,3-epoxycyclopentyl)ether and 15.8 parts by weight of meta-phenylenediamine.

It is postulated that the said block prepolymer has an epoxide equivalent of about 190.

The mixture is cured as follows:

7 hours at 120° F., then
7 hours at 150° F., then
7 hours at 200° F., then
7 hours at 270° F., then
6–24 hours at 320° F.

Example 18

Example 14 is once again repeated using 10 parts by weight of the glyamine prepolymer of Example 5 and 100 parts by weight of the liquid isomer of bis(2,3-epoxycyclopentyl)ether and 29.7 parts by weight of meta-phenylenediamine.

It is postulated that the said block prepolymer has an epoxide equivalent of about 100.

The mixture is cured as follows:

7–12 hours at 150° F., then
7 hours at 170° F., then
7 hours at 210° F., then
7 hours at 270° F., then
6–24 hours at 320° F.

Example 19

100 parts by weight of the glyamine prepolymer of Example 5, and 100 parts by weight of the solid isomer of bis(2,3-epoxycyclopentyl)ether are heated to 220° F. The mixture is maintained at between 220–230° F. while stirring until the solid isomer of bis(2,3-epoxycyclopentyl)ether is molten and a homogeneous liquid mixture of both reactants is obtained. The reaction product thus obtained is immediately cooled to room temperature and is also called a block prepolymer.

It is postulated that the said above block prepolymer has an epoxide equivalent of about 129.

The said block prepolymer is cured using meta-phenylenediamine as the curing agent.

Procedure for adding meta-phenylenediamine to said block prepolymer is as follows:

(1) The said block prepolymer is maintained at room temperature; prior to addition of curing agent.

(2) 56.8 parts by weight meta-phenylenediamine are preheated to between 150° F. and 155° F. until molten.

(3) The molten meta-phenylenediamine is maintained at between 150° F. and 155° F. and is then added to the block prepolymer.

(4) The admixture of block prepolymer and meta-phenylenediamine is stirred until it is homogeneous.

(5) The homogeneous admixture of block prepolymer and meta-phenylenediamine is allowed to stand at room temperature until it becomes gelled.

(6) Finally, the gelled admixture is cured as follows:

7 hours at 135° F., then
7 hours at 210° F., then
7 hours at 270° F., then
6–24 hours at 320° F.

The following examples are typical tabulations of aromatic amines; and concentration ranges of said amines required to cure the block prepolymers of Examples 14, 15, 16 and 19.

Example 20

| Amine curing agent | Parts by weight amine per 100 parts by weight of block prepolymer of Example 14 |
|---|---|
| Meta-phenylenediamine | 23–30 |
| Meta-tolylenediamine | 26–32 |
| 1,8-naphthylenediamine | 34–43 |
| 4,4'-methylenedianiline | 42–53 |

Example 21

| Amine curing agent | Parts by weight amine per 100 parts by weight of block prepolymer of Examples 15 and 19 |
|---|---|
| Meta-phenylenediamine | 20–28.5 |
| Meta-tolylenediamine | 23–29.0 |
| 1,8-naphthylenediamine | 31–39.0 |
| 4,4'-methylenedianiline | 37–48.0 |

Example 22

| Amine curing agent | Parts by weight amine per 100 parts by weight of block prepolymer of Example 16 |
|---|---|
| Meta-phenylenediamine | 21–29 |
| Meta-tolylenediamine | 23.6–29.5 |
| 1,8-naphthylenediamine | 31.5–39.5 |
| 4,4'-methylenedianiline | 38.6–48.5 |

Various additives, mostly conventional ones in a general sense, may be added to the compositions of this invention. These include plasticizers, fillers, stabilizers, anti-fouling compounds, anti-oxidants, and the like.

Suitable plasticizers are:

Dibutyl phthalate
Dioctyl phthalate
Diethyl phthalate
Dibutyl sebacate
Dioctyl adipate
Dimethyl sebacate
Ethylene glycol
Propylene glycol
Mineral oil
Triphenyl phosphate
Tricresyl phosphate
Tris(beta-chloroethyl)phosphate
Tri(dichloropropyl)phosphate
Castor oil Any suitable filler may be added to the mixture, according to the invention. A few examples of fillers to be mentioned are iron oxide, lead oxide, aluminum oxide, siliceous chalk, carbon black, silica sand, silica flour, ground mica, calcium carbonate, calcium silicate, granulated cork, graphite, limestone, marble flour, silicone carbide, wood flour, and vermiculite, and resinous glass or metallic spheres. The said spheres may be either solid or hollow.

Other additives or fillers that may be employed in accordance with my invention are glass or resinous microspheres, resinous or glass microballoons, metallic microspheres, metallic microballoons, etc. The said above microballoons or microspheres may be either hollow or solid. The hollow microspheres or hollow microballoons not only act as fillers but also add buoyance to the composition when a body of the composition containing these hollow microspheres or hollow microballoons, or bodies, is immersed in a liquid. The amount of the filler to be used is governed by:

(a) The particle size of the filler, and
(b) The density of the filler, and
(c) The bulking value of the filler.

In addition, the following organotin compounds may be added to the glyamine prepolymers for the preparation of anti-fouling coating or anti-fouling paints.

Organotin compounds:
Dimethyltin dichloride
Dibutyltin dichloride
Dibutyltin di-2-ethylhexoate
Dibutyltin naphthenate
Dibutyltin sulfide
Diphenyltin dichloride
Dioctyltin dichloride
Dilauryltin dichloride
Triethyltin acetate
Triisopropyltin chloride
Tripropyltin chloride
Tributyltin chloride
Tributyltin undecenylate
Tributyltin dodecylsuccinate
Tributyltin oxide
Tributyltin sulfide
Tributyltin polylinoleate
Hexabutyl ditin
Triamyltin acetate
Triphenyltin chloride
Triphenyltin acetate The preferred organotin compound is bis(tri-N-butyltin) oxide. However, of the organotin compounds now available, those containing triphenyltin or tributyltin radicals are likely to function as the most effective marine organism deterrents. The concentration of organotin as an anti-fouling ingredient when added to the glyamine prepolymers is about 100 parts by weight of the glyamine prepolymer to between 10 to 80 parts by weight of the organotin compound.

The preferred concentration of organotin is between 50 to 80 parts by weight of tin to 100 parts by weight of the glyamine prepolymer.

Example 23

Constituents: Parts by wt.
Prepolymer obtained by the reaction of 1,4-butanediol diglycidyl ether and monotertiary-butyl-hydroquinone _____ 100
Bis(tri-N-butyltin)oxide _____ 70
Pyrogenic silica (Cab-O-Sil) _____ 8
Triethylenetetramine _____ 8-20

The above example demonstrates a specific embodiment wherein an anti-fouling tin compound is used. It is of course understood that in this formulation the diepoxycycloaliphatic ether, e.g., bis-(2,3-epoxyclopentyl) ether is to be added as heretofore described and exemplified to produce the block copolymers of this invention.

As a very general rule, various properties in the final cured block copolymer resin are obtainable by varying the components in accordance with the disclosure in this invention. Thus, by using different glyamine prepolymers and by the employment of varying amounts thereof and further, by selecting different aromatic diamine curing agents, a multitude of different copolymer resins may be produced. It is, of course, clear that the specific requirements of the final resin will determine the particular type of formula which should be used, all within the scope of the action as herein disclosed.

In preparing the block copolymers of the present invention in accordance with the above description and in line with the specific exemplifications which have been given, the following general procedures should be followed in all cases since these have been found to be critical in order to obtain the optimum in properties in the final block copolymer composition. As described and exemplified above, the glyamine prepolymers are first premixed with the diepoxycycloaliphatic ether compound. To this mixture, which should be at a temperature not above about 100° F. and preferably not exceeding about 75° F. there is then added the aromatic polyamine curing agents. Since the latter are, in most instances, solid compounds at ambient conditions, i.e. room temperature, it is necessary to premelt the polyamine in order to effect the addition thereof to the other components. It is desirable and necessary that the temperature of the amine curing agent at the time of addition to the other components, shall not exceed the liquefying point (i.e., melting point) thereof by more than about 10° F. Finally, after all of the components have been thoroughly mixed, the resultant admixture is permitted to set at about room temperature to not exceeding about 100° F. and preferably not above about 85° F. prior to effecting the final and complete cure of the resin composition. The final stage in the production of the block copolymers of this invention involves a curing of the components in accordance with a prescribed curing schedule. Such a curing schedule generally involves extended heated periods of different levels of temperature whereby the temperature is gradually raised until the final cycle is at the most elevated temperature employed during the entire curing steps. A typical curing schedule is as follows:

7 to 12 hours at 120° to 150° F., then
7 hours at 150° to 200° F., then
6 hours at 270° F., and finally
6 to 24 hours at 320° F.

It is of course clearly understood that these times and temperatures which may be varied considerably with the final curing being carried out at temperatures somewhat above 320° F. and up to a temperature as high as about 355° F. The use of somewhat higher temperatures will vary with the times employed in the curing cycle and these will again vary depending upon the specific nature of the various components making up the final block copolymer resin.

By the use of the term "room temperature," it is intended to include temperatures in the range of about 30° F. to 100° F. in an atmosphere of unspecified relative humidity, including the range of 68° F.–86° F. recited as the room temperature range by the ASTM Standards on Plastics, 12th edition, March 1961.

It will be further clearly understood that various changes in the details, materials and arrangement of steps which have been herein described and illustrated in order to explain the nature of the invention may be made by those skilled in the art within the principal spirit and scope of the invention as expressed in the appended claims.

I claim:
1. The method for making a resinous block copolymer which comprises:
   (A) a prepolymer of the reaction product of
      (a) 100 parts by weight of a diglycidyl ether of a polyhydric alcohol having a hydrocarbon chain between the hydroxyl groups, and
      (b) from 15 to 85 parts by weight of a material selected from the group consisting of aromatic chlorine-hindered diamines, aromatic sulfur-containing diamines, hydroquinone, monotertiary butylhydroquinone, toluhydroquinone, hydroquinone monomethyl ether and 2,5 - ditertiary-butylhydroquinone,
   (B) a material selected from the group consisting of a diepoxycycloaliphatic ether which contains more than one oxirane atom bonded to cycloaliphatic carbon atoms, and varying from 1 part by weight thereof per 10 parts by weight of (A) to 10 parts by weight thereof per 1 part by weight of (A), and
   (C) from about 6 to 60 parts by weight per 100 parts by weight of (A) and (B) of an aromatic polyamine in the liquid state and permitting the mixture of (A), (B) and (C) to set and thereafter subjecting such mixture to an elevated temperature cure.

2. The method as defined in claim 1 wherein component (a) is 1,4-butanediol diglycidyl ether.

3. The method as defined in claim 1 wherein component (b) is hydroquinone.

4. The method as defined in claim 1 wherein component (b) is monotertiary-butylhydroquinone.

5. The method as defined in claim 2 wherein component (b) is hydroquinone.

6. The method as defined in claim 2 wherein component (b) is monotertiary-butylhydroquinone.

7. The method as defined in claim 1 wherein component (B) is bis(2,3-epoxycyclopentyl)ether.

8. The method as defined in claim 1 wherein component (B) is the homopolymer of bis(2,3-epoxycyclopentyl)ether.

9. The method as defined in claim 1 wherein component (C) is meta-phenylenediamine.

10. The method as defined in claim 2 wherein component (C) is meta-phenylenediamine.

11. A resinous block copolymer comprising the reaction product of
   (A) a prepolymer of the reaction product of
      (a) 100 parts by weight of a diglycidyl ether of a polyhydric alcohol having a hydrocarbon chain between the hydroxyl groups, and
      (b) from 15 to 85 parts by weight of a material selected from the group consisting of aromatic chlorine-hindered diamines, aromatic sulfur-containing diamines, hydroquinone, hydroquinone monomethyl ether, monotertiary-butylhydroquinone, toluhydroquinone and 2,5-ditertiary-butylhydroquinone,
   (B) a material selected from the group consisting of a diepoxycycloaliphatic ether which contains more than one oxirane atom bonded to cycloaliphatic carbon atoms, and varying from 1 part by weight thereof per 10 parts by weight of (A) to 10 parts by weight thereof per 1 part by weight of (A), and
(C) from about 6 to 60 parts by weight per 100 parts
by weight of (A) and (B), of an aromatic polyamine in the liquid state and permitting the mixture of (A), (B) and (C) to set and thereafter subjecting such mixture to an elevated temperature cure.

12. The resinous block copolymer of claim 11 wherein component (B) is the liquid isomer of bis(2,3-epoxycyclopentyl)ether.

13. The resinous block copolymer of claim 11 wherein component (B) is the solid isomer of bis(2,3-epoxycyclopentyl)ether.

14. The resinous block copolymer of claim 11 wherein component (B) is the homopolymer of bis(2,3-epoxycyclopentyl)ether.

References Cited
UNITED STATES PATENTS

| | | | |
|---|---|---|---|
| 3,033,803 | 5/1962 | Price | 260—2 |
| 3,070,579 | 12/1962 | Semque | 260—2 |

MURRAY TILLMAN, *Primary Examiner.*

P. LIEBERMAN, *Assistant Examiner.*